United States Patent [19]

Miyoshi et al.

[11] 4,388,360

[45] Jun. 14, 1983

[54] MAGNETIC RECORDING MEDIUM

[75] Inventors: Takahito Miyoshi; Toshimitu Okutu, both of Odawara; Masaaki Takimoto, Tokyo; Takashi Saida, Asaka; Goro Akashi; Masaaki Fujiyama, both of Odawara, all of Japan

[73] Assignee: Fuji Photo Film Company Limited, Kanagawa, Japan

[21] Appl. No.: 356,540

[22] Filed: Mar. 9, 1982

[30] Foreign Application Priority Data

Mar. 9, 1981 [JP] Japan .................................. 56-33581

[51] Int. Cl.$^3$ ............................................. H01F 10/02
[52] U.S. Cl. ................................... 428/172; 428/328; 428/336; 428/694; 428/695; 428/900
[58] Field of Search ............... 428/172, 328, 336, 694, 428/695, 900

[56] References Cited

U.S. PATENT DOCUMENTS 3,687,725 8/1972 Hartmann et al. .................. 117/235

Primary Examiner—Bernard D. Pianalto
Attorney, Agent, or Firm—Sughrue, Mion, Zinn, Macpeak and Seas

[57] ABSTRACT

A magnetic recording medium is disclosed which is comprised of a nonmagnetic support base having a magnetic layer disposed on one surface. A back coating is disposed on the opposite surface of the support base in order to provide the magnetic recording medium with greater durability without increasing the coefficient of friction. The back coating is comprised of a binder having inorganic particles dispersed therein, the inorganic particles including $SnO_2$ particles having an average size of about 0.01 to about $0.8\mu$. The back coating does not reduce the S/N ratio of the recording medium.

10 Claims, No Drawings

MAGNETIC RECORDING MEDIUM

FIELD OF THE INVENTION

The present invention relates to a magnetic recording medium, and more particularly, to a magnetic tape that has a low coefficient of friction, great durability to running without sacrificing the S/N ratio and which is free from edge bends and scraped back surface and causes very few dropouts.

BACKGROUND OF THE INVENTION

Audio, video and computer magnetic recording tapes have magnetic recording layers that are given a smooth surface to provide higher sensitivity, particularly higher output in high-frequency ranges, as disclosed in, for example, U.S. Pat. No. 3,597,273. However, these smooth-surfaced magnetic recording tapes cannot be wound or rewound smoothly into a neat pack, and variations in tape tension reduce the running properties of the tape and cause fluctuations in tape output. Furthermore, these tapes are easily deformed or damaged. To eliminate these defects, a magnetic recording tape has been proposed that has a back coating on the surface of the nonmagnetic base opposite that having a magnetic recording layer. However, the conventional back coating is easily scraped, its wear coefficient is easily increased or edge bends will easily occur. In addition, the coating has high surface electrical resistance and easily accumulates static charges. As a result, small dust particles or scratches will cause dropouts ver easily. For these reasons, the conventional back coating needs further improvements. U.S. Pat. Nos. 4,135,031 and 4,135,032 proposed a magnetic recording tape having a back coating containing inorganic particles such as graphite, carbon black powder, etc. However, graphite and carbon black powder are easily scraped, so that the back coating has poor durability to running and causes dropouts after repeated use while the back coating does not cause dropouts at the initial stage since it has good electroconductivity. Further they are dispersed in a binder only with difficulty and are apt to form aggregates, encountering a problem in the formation of a back coating having a smooth surface.

It is general practice to form a back coating on a magnetic recording layer to provide better running properties and increased durability to running. However, as is known well, when the resulting magnetic recording medium is rolled into a tape pack or sheets of it are stacked, the unevenness of the surface of the back coating is transferred onto the surface of the magnetic layer, impairing the surface quality of the latter. As a consequence, the electromagnetic properties, particularly, the S/N ratio, of the magnetic recording medium are reduced. As is often observed, the back coating is given a rough surface so as to achieve the best running properties. However, this causes the unevenness of its surface to be transferred onto the surface of the magnetic layer while the magnetic recording medium is stored in the form of a tape roll or stacked sheets.

SUMMARY OF THE INVENTION

Therefore, one object of the present invention is to provide a magnetic recording medium that has great durability to running without increasing the friction coefficient.

Another object of the present invention is to provide a magnetic recording medium having a back coating that does not reduce the S/N ratio of the recording medium.

These objects of the present invention can be achieved by a magnetic recording medium having a magnetic layer on one surface of a nonmagnetic base and a back coating on the other surface that is not more than $1\mu$ thick and which contains inorganic particles and a binder, $SnO_2$ particles being used as said inorganic particles.

DETAILED DESCRIPTION OF THE INVENTION

The $SnO_2$ particles used in the present invention are electrically conductive and are very effective in prevention of static buildup. The $SnO_2$ particles are contained in the back coating either alone or in admixture with other inorganic particles as described in, for example, U.S. Pat. Nos. 4,135,031 and 4,135,032. Examples of the inorganic particles that can be mixed with the $SnO_2$ particles are carbon black powder, graphite, tungsten disulfide, molybdenum disulfide, boron nitride, silicon dioxide, calcium carbonate, aluminum oxide, iron oxide, titanium dioxide, magnesium oxide, zinc oxide, calcium oxide, lithopone and talc. The $SnO_2$ may be in the form of fine particles, and they may be incorporated in the back coating together with other inorganic particles that are coated with them or as a colloidal dispersion containing barium sulfate particles. The inorganic particles used in the present invention preferably have an average size of from 0.01 to $0.8\mu$, more preferably from 0.06 to $0.4\mu$.

Any binder known in the art can be used in the present invention, for example, thermoplastic resins, thermosetting resins or reaction resins and mixtures thereof. Suitable thermoplastic resins are a vinyl chloride/vinyl acetate copolymer, vinyl chloride/vinylidene chloride copolymer, vinyl chloride/acrylonitrile copolymer, acrylic ester/acrylonitrile copolymer, acrylic ester/vinylidene chloride copolymer, acrylic ester/styrene copolymer, methacrylic ester/acrylonitrile copolymer, methacrylic ester/vinylidene chloride copolymer, methacrylic ester/styrene copolymer, urethane elastomer, polyvinyl fluoride, vinylidene chloride/acrylonitrile copolymer, butadiene/acrylonitrile copolymer, polyamide resin, polyvinyl butyral, cellulosic resins, (e.g., cellulose acetate butyrate, cellulose diacetate, cellulose propionate and nitrocellulose), styrene/butadiene copolymer, polyester resin, chlorovinyl ether/acrylic ester copolymer, amino resin and various rubber resins. Suitable thermosetting or reaction resins are a phenolic resin, epoxy resin, polyurethane curable resin, urea resin, melamine resin, alkyd resin, acrylic reaction resin, polyisocyanate and polyamine. A ternary system comprising a cellulosic resin, thermoplastic polyurethane elastomer and polyisocyanate is particularly preferred. A suitable example of the cellulosic resin is a cellulosic derivative such as nitrocellulose, and the resin is useful for providing heat resistance, toughness and blocking resistance. Practically all commercial products can be used as the thermoplastic polyurethane elastomer. Examples are polyester polyurethane resins that are prepared by reacting polyisocyanate compounds such as tolylene diisocyanate, 4,4'-diphenylmethane diisocyanate, hexamethylene diisocyanate, and metaxylylene diisocyanate with polyester polyols that are obtained by reacting organic dibasic acids such as phthalic acid, adipic acid, dimerized linoleic acid and maleic acid with glycols such as ethylene glycol, propylene glycol, butylene glycol and diethylene glycol or polyhydric alcohols such as trimethylolpropane, hexanetriol, glycerin, trimethylolethane and pentaerythritol; polyether polyurethane resins; and compounds having

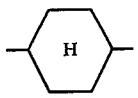

ring in a molecular structure of the formula:

[—(O—R—OOC—R'—CO)$_m$—OROOCNH—R"
—NHCO—]

wherein m is an integer of 5 to 100; R is a divalent group that is introduced by an alicyclic or aromatic compound having at least two hydroxyalkyl groups having 1 to 4 carbon atoms or at least two hydroxyalkoxyl group having 1 to 4 carbon atoms; R' is

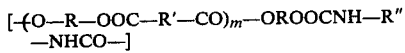

R" is

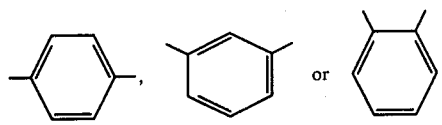

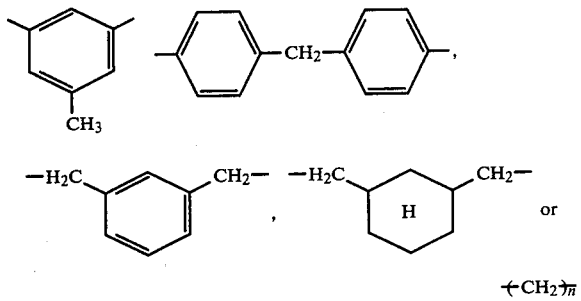

—(—CH$_2$—)$_n$— and n is an integer of 4 to 6. These polyurethane resins preferably have a molecular weight of from 5,000 to 500,000, and those having a molecular weight of from 10,000 to 200,000 are particularly preferred. For more information on these resins, see Japanese Patent Application (OPI) No. 122234/80. Suitable polyisocyanates are 2,4-tolylene diisocyanate, 1,6-hexamethylene diisocyanate, and triisocyanate (for example, "Collonate L" of Nippon Polyurethane Industry Co., Ltd.).

The preferred composition of the binder which is used in connection with the present invention is that described in Japanese Patent Application (OPI) No. 11305/74 wherein a hundred parts by weight of the binder consists of 20 to 80 parts, more preferably 30 to 60 parts, by weight of the cellulosic resin, 20 to 50 parts, more preferably 30 to 40 parts, by weight of the thermoplastic polyurethane elastomer, and 10 to 50 parts, more preferably 20 to 40 parts, by weight of the polyisocyanate.

The weight ratio of the inorganic particles to the binder incorporated in the back coating is preferably from 2.5:1 to 0.1:1, more preferably from 1.5:1 to 0.8:1. The thickness of the back coating according to the present invention is determined so that the total thickness of the magnetic recording medium including the magnetic layer, base and back coating is as small as possible in order to increase the recording density for a unit volume. For this purpose, the back coating is preferably 0.3 to 2μ, more preferably 0.5 to 1μ thick. Better results are obtained if the surface of the back coating has a center-line average roughness of not more than 0.05μ, preferably not more than 0.024μ, for a cut-off value of 0.08 mm.

A thin back coating formed on the magnetic recording medium according to the conventional technique breaks, or is scraped, when the medium is caused to run. However, these defects are absent from the back coating specified in the present invention. As a further advantage, a magnetic recording medium using the back coating according to the present invention enables high-density recording at a wavelength of 1.3μ without reducing the video S/N ratio. For other materials that can be used in preparing the magnetic recording medium of the present invention and the method for preparing it, see U.S. Pat. No. 4,135,016.

The present invention is now described in greater detail by reference to the following example which is given here for illustrative purposes only and is by no means intended to limit its scope. In the example, all parts are by weight.

EXAMPLE

One surface of a polyethylene terephthalate base 14μ thick was coated with a magnetic layer containing Cocontaining γ-iron oxide particles and the other surface with a back coating. The dry thickness of the magnetic layer was 5μ. The back coating was applied in a dry thickness of 0.8μ from a dispersion made of either the binder composition A or B indicated below and one of the inorganic particles specified in Table 1.

| Binder Composition A | |
|---|---|
| Vinyl chloride/vinyl acetate copolymer ("400X-110A" of the Japanese Geon Co., Ltd.) | 30 parts |
| Polyurethane ("Nipporan 2301" of Nippon Polyurethane Industry Co., Ltd.) | 15 parts |
| Polyisocyanate ("Collonate L" of Nippon Polyurethane Industry Co., Ltd.) | 25 parts |
| Methyl ethyl ketone | 300 parts |
| Binder Composition B | |
| Nitrocellulose | 30 parts |
| Polyurethane ("Nipporan 2301" of Nippon Polyurethane Industry Co., Ltd.) | 15 parts |
| Polyisocyanate ("Collonate L" of Nippon Polyurethane Industry Co., Ltd.) | 25 parts |
| Methyl ethyl ketone | 300 parts |

100 parts of the inorganic particles were mixed with either binder. The following five tests were conducted with the respective magnetic tape samples, and the results are set forth in Table 1.

Test 1

A virgin tape was caused to run 100 passes on a VHS video deck and its durability was compared with the initial value by measuring the tension both at the entrance of the rotary cylinder ($T_1$) and at the exit ($T_2$). The tape was also checked for any fluctuation in tape output.

Test 2

A virgin tape was caused to run 100 passes and its dynamic friction coefficient ($T_2/T_1$) against a stainless steel pole (3.3 cm/sec.) was checked for the side of both the magnetic layer and the back coating. The result was compared with the initial value.

Test 3

A virgin tape was caused to run 100 passes on a VHS video deck and checked for any worn back coating and damaged tape surface.

Test 4

A virgin tape was caused to run 100 passes on a VHS video deck and the number of dropouts per minute was counted.

Test 5

The surface electrical resistance of the back coating was checked.

TABLE 1

| Sample No. | Binder Composition | Amount of Inorganic Particles Added (parts) CaCO$_3$ Powder | Amount of Inorganic Particles Added (parts) SnO$_2$ Powder | Output Fluctuation After 100 Passes (dB) | Deck Tension of Virgin Tape ($T_2/T_1$) | Deck Tension After 100 passes ($T_2/T_1$) | Friction Coefficient of Virgin Tape ($\mu$) ($T_2/T_1$) Magnetic Face | Friction Coefficient of Virgin Tape ($\mu$) ($T_2/T_1$) Back Face |
|---|---|---|---|---|---|---|---|---|
| 1 | A | 100 | — | 1.4 | 100/40 | 95/35 | 0.35 | 0.22 |
| 2 | A | 50 | 50 | 1.2 | 97/37 | 92/32 | 0.35 | 0.20 |
| 3 | B | 100 | — | 0.4 | 95/40 | 90/35 | 0.34 | 0.24 |
| 4 | B | 75 | 25 | 0.4 | 95/40 | 90/35 | 0.34 | 0.24 |
| 5 | B | 50 | 50 | 0.3 | 90/37 | 88/33 | 0.34 | 0.20 |
| 6 | B | 25 | 75 | 0.3 | 90/37 | 88/33 | 0.34 | 0.20 |
| 7 | B | — | 100 | 0.3 | 90/37 | 88/33 | 0.34 | 0.20 |

| Sample No. | Friction Coefficient of Tape ($\mu$) After 100 passes Magnetic Face | Friction Coefficient of Tape ($\mu$) After 100 passes Back Face | Tape Wear After 100 Passes | Tape Damage (Edge Bend or Nick) | Number of Dropouts (per min.) Virgin Tape | Number of Dropouts (per min.) After 100 passes | Surface Electrical Resistance ($\Omega/in^2$) |
|---|---|---|---|---|---|---|---|
| 1 | 0.33 | 0.20 | much | much | 12 | 20 | $1.0 \times 10^{13}$ or more |
| 2 | 0.33 | 0.19 | small | much | 8 | 10 | $1.0 \times 10^8$ |
| 3 | 0.32 | 0.24 | small | small | 10 | 12 | $1.0 \times 10^{13}$ or more |
| 4 | 0.32 | 0.24 | small | small | 8 | 10 | $1.0 \times 10^{12}$ or more |
| 5 | 0.32 | 0.19 | very small | small | 4 | 5 | $1.2 \times 10^8$ |
| 6 | 0.32 | 0.19 | very small | small | 4 | 5 | $7.0 \times 10^5$ |
| 7 | 0.32 | 0.19 | very small | small | 3 | 4 | $3.0 \times 10^5$ |

As is clear from the table, a magnetic recording medium with a thin back coating that contains SnO$_2$ particles as the filler exhibits great durability to running without sacrificing the S/N ratio, and it causes very few dropouts while proving effective against static buildup.

Further the back coating containing as a binder composition a cellulosic resin, thermoplastic polyurethane elastomer and polyisocyanate with SnO$_2$ particles effectively prevents the tape wear and the tape damage and minimizes the output fluctuation, as compared to those using other binder compositions. In addition, when at least 50% of SnO$_2$ particles are used with other inorganic particles as the filler, the tape wear and the output fluctuation can effectively be suppressed.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a nonmagnetic support base;
   a magnetic layer on a first surface of said nonmagnetic support base; and
   a back coating on a second surface of said nonmagnetic support base, having a thickness of 1$\mu$ or less, said back coating being comprised of inorganic particles dispersed in a binder, wherein said inorganic particles include SnO$_2$ particles.

2. A magnetic recording medium as claimed in claim 1, wherein said binder is comprised of a cellulosic resin, a thermoplastic polyurethane elastomer and a polyisocyanate.

3. A magnetic recording medium as claimed in claim 1, wherein the surface of said back coating has a center-line average roughness of 0.05$\mu$ or less for a cut-off value of 0.08 mm.

4. A magnetic recording medium as claimed in claim 3, wherein said center-line average roughness is 0.024$\mu$ or less.

5. A magnetic recording medium as claimed in claim 1, wherein said inorganic particles have an average size within the range of about 0.01 to 0.8$\mu$.

6. A magnetic recording medium as claimed in claim 5, wherein said particles have an average size of about 0.06 to about 0.4$\mu$.

7. A magnetic recording medium as claimed in claim 2, wherein said cellulosic resin comprises 30 to 60 parts by weight of said binder, said thermoplastic polyurethane elastomer comprises 30 to 40 parts by weight of said binder, and said poly-isocyanate comprises 20 to 40 parts by weight of said binder.

8. A magnetic recording medium as claimed in claim 1, wherein said back coating has a thickness of 0.5 to 1$\mu$.

9. A magnetic recording medium as claimed in claim 8, wherein the weight ratio of said inorganic particles to said binder is within the range of 2.5:1 to 0.1:1.

10. A magnetic recording medium as claimed in claim 9, wherein said ratio is within the range of 1.5:1 to 0.8:1.

* * * * *